(12) United States Patent
Naka et al.

(10) Patent No.: US 11,631,426 B1
(45) Date of Patent: Apr. 18, 2023

(54) HARD DISK DRIVE SUSPENSION PAD PEEL-PREVENTION CONFIGURATION

(71) Applicant: Western Digital Technologies, Inc., San Jose, CA (US)

(72) Inventors: Kohichiroh Naka, Fujisawa (JP); Hiroyasu Tsuchida, Fujisawa (JP); Kenichi Murata, Ebina (JP); Yuhsuke Matsumoto, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/551,911

(22) Filed: Dec. 15, 2021

(51) Int. Cl.
G11B 5/48 (2006.01)
(52) U.S. Cl.
CPC ............ *G11B 5/4813* (2013.01); *G11B 5/486* (2013.01); *G11B 5/4853* (2013.01)
(58) Field of Classification Search
None
See application file for complete search history.

(56) References Cited

U.S. PATENT DOCUMENTS

| | | | | |
|---|---|---|---|---|
| 4,761,699 A * | 8/1988 | Ainslie | ............... | G11B 21/16 |
| 7,403,357 B1 * | 7/2008 | Williams | ............. | G11B 5/4853 |
| | | | | 360/245.9 |
| 8,325,447 B1 * | 12/2012 | Pan | ...................... | G11B 5/4853 |
| | | | | 360/245.9 |
| 8,477,457 B2 | 7/2013 | Matsumoto et al. | | |
| 8,792,212 B1 * | 7/2014 | Pan | ...................... | G11B 5/4826 |
| | | | | 360/245.9 |
| 9,640,757 B2 | 5/2017 | Zheng | | |
| 9,728,211 B1 | 8/2017 | Murata et al. | | |
| 10,600,435 B2 | 3/2020 | Klarqvist | | |
| 2008/0170333 A1 * | 7/2008 | Ohsawa | ................. | G11B 5/486 |
| | | | | 360/244.5 |
| 2009/0091860 A1 | 4/2009 | Pena et al. | | |
| 2010/0321829 A1 | 12/2010 | Hutchinson et al. | | |
| 2011/0019311 A1 | 1/2011 | Greminger et al. | | |
| 2016/0012839 A1 * | 1/2016 | Arai | ..................... | G11B 5/4826 |
| | | | | 360/245.9 |
| 2020/0098388 A1 | 3/2020 | Davidson et al. | | |

OTHER PUBLICATIONS

Matthes, Liane et al., Suppression of cross-track vibrations using a self-sensing micro-actuator in hard disk drives, Microsystem Technologies, Received: Sep. 26, 2011 / Accepted: May 7, 2012 / Published online: Jun. 1, 2012, pp. 1309-1317, vol. 18, Springer-Verlag.

* cited by examiner

*Primary Examiner* — William J Klimowicz
(74) *Attorney, Agent, or Firm* — John D. Henkhaus

(57) ABSTRACT

A hard disk drive suspension assembly includes a pad base layer, a pad-end fixing layer, and a plurality of electrical pads each comprising a conductive layer on the pad base layer, where the base layer extends to the fixing layer, to which a distal end of the base layer is fixed. This configuration inhibits the delamination or deformation of the end edge of each pad. An additional cover layer may be implemented to cover the distal end of the conductive layer(s), further inhibiting deformation of the pads. These techniques are especially relevant with narrow, high-density, small pitch electrical pads.

20 Claims, 6 Drawing Sheets

HARD DISK DRIVE SUSPENSION PAD PEEL-PREVENTION CONFIGURATION

FIELD OF EMBODIMENTS

Embodiments of the invention may relate generally to hard disk drives, and particularly to approaches to suspension electrical pads configured to inhibit peeling.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

To write data to or read data from the recording medium, the head has to receive instructions from a controller. Hence, the head is electrically connected to the controller in some manner such that not only does the head receive instructions to read/write data, but the head can also send information back to the controller regarding the data read and/or written. Typically, a flexible printed circuit (FPC) mounted on a suspension is used to electrically transmit signals from the read-write head to other electronics within an HDD. At one end, the FPC-suspension assembly and the head are electrically connected together typically with solder at the head slider. To connect these components with solder, the suspension electrical pads and the slider electrical pads are heated, typically using a solder reflow, hot air, or a laser to heat the materials in the bonding procedure.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
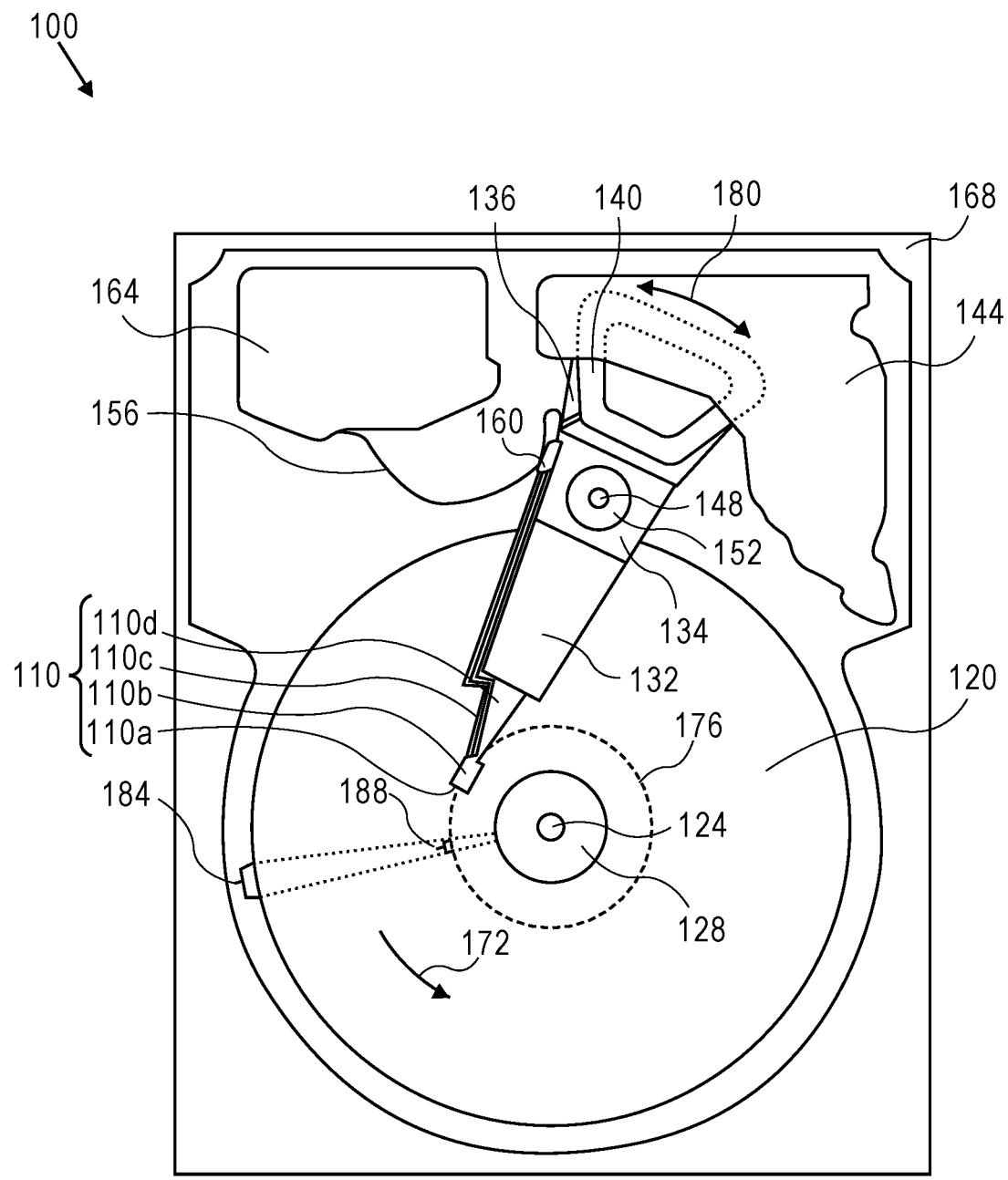
FIG. 1 is a plan view illustrating a hard disk drive, according to an embodiment.

Generally, approaches to suspension electrical pads configured to inhibit peeling are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that a flexible printed circuit (FPC) mounted on a suspension is typically used to electrically transmit signals from the read-write head to other electronics within an HDD, that the FPC-suspension assembly and the head are electrically connected together with solder at the head slider via connection pads on the respective components. The number of slider electrical connections, and thus the number of connection pads on the slider and the suspension, is expected to increase over time due to the implementation of new technologies, such as energy-assisted magnetic recording (EAMR) e.g., heat-assisted magnetic recording (HAMR), microwave-assisted magnetic recording (MAMR), and the like. Consequently, to make room for the additional connection pads the size of the pads are expected to decrease accordingly, including narrowing the pads to inhibit solder bridges between pads, where electrical bonds are formed between adjacent pads. When the suspension pads are narrowed, pad bending may occur during HDD operation and there is a risk that pads may undesirably peel off or delaminate at the pad edge and cause increasingly more solder defects thereby worsening head gimbal assembly (HGA) yield.

Figure 2A:
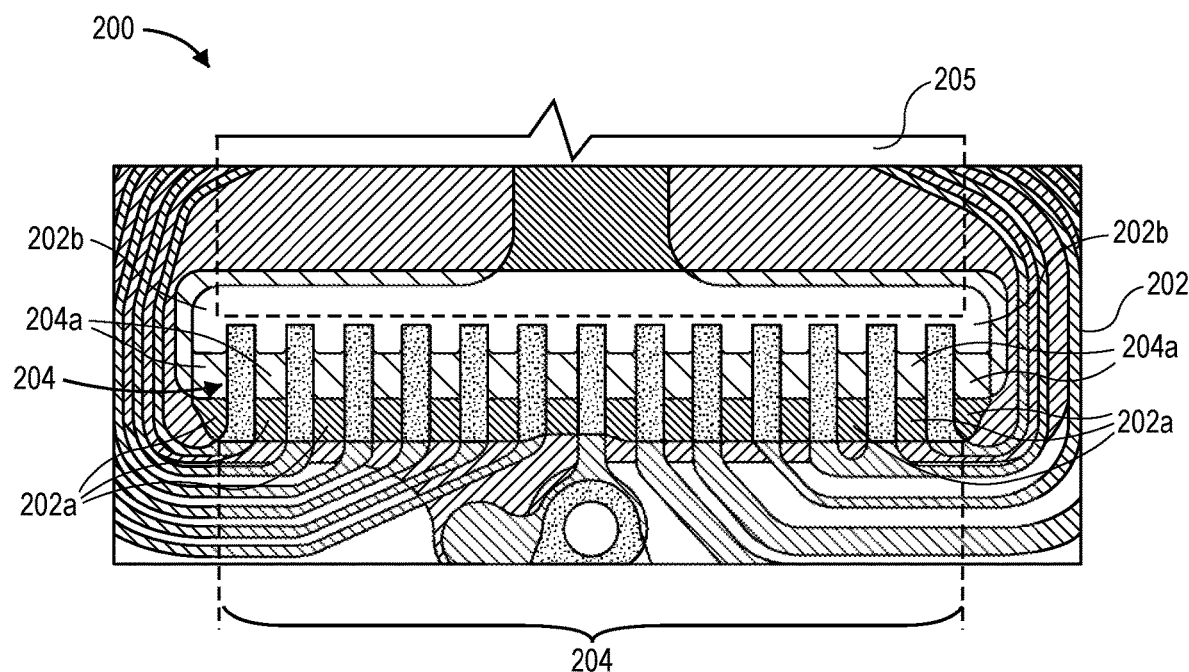
FIG. 2A is a top view illustrating a 13-pad configuration for a suspension, according to an embodiment.
Figure 2B:
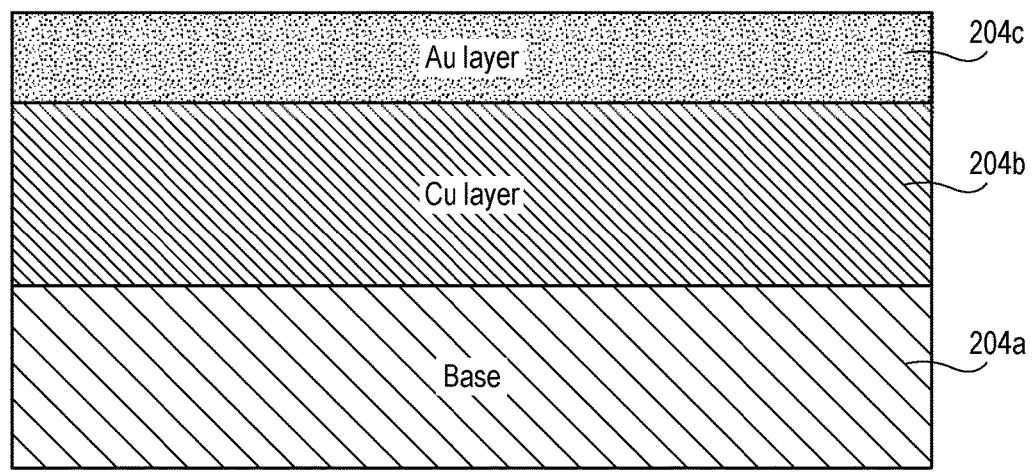
FIG. 2B is a cross-sectional side view illustrating the construction of a suspension electrical pad of FIG. 2A, according to an embodiment.
Figure 2C:
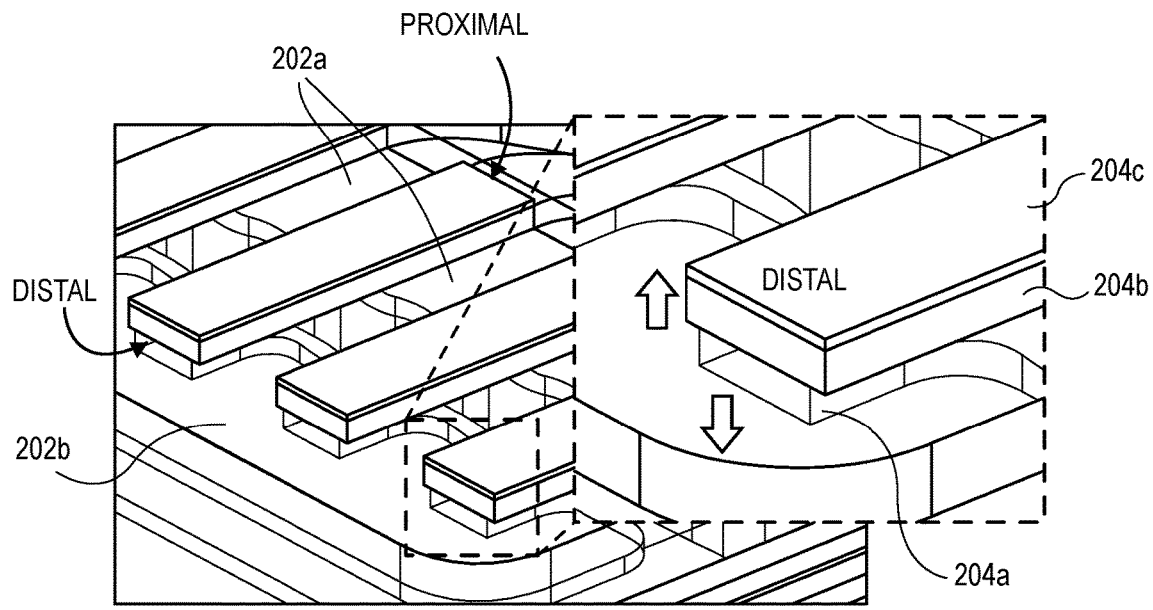
FIG. 2C is a perspective view illustrating the construction of suspension electrical pads of FIG. 2A, according to an embodiment.

FIG. 2A is a top view illustrating a 13-pad configuration for a suspension, FIG. 2B is a cross-sectional side view illustrating the construction of a suspension electrical pad of FIG. 2A, and FIG. 2C is a perspective view illustrating the construction of suspension electrical pads of FIG. 2A, all according to an embodiment. The suspension-pad configuration 200 of FIGS. 2A-2C comprises a suspension 202 (or "lead suspension"), on which a plurality of electrical connection pads 204 (or simply "electrical pads", "connection pads", "bond pads" or "pads") are coupled. A head slider 205 is also depicted in FIG. 2A in phantom for reference purpose. The suspension 202 of configuration 200 comprises surface(s) such as PI layer 202a (only some of which are labeled, for clarity) typically composed of the polyimide ("PI") polymer. The pad 204 configuration comprises a pad base layer 204a which supports a copper layer 204b (or "Cu layer") on which lies a gold layer 204c (or "Au layer"). This electrical pad construction is referred to herein as a "flying lead", in that the distal ends of the pads 204 including the base layer 204a, copper layer 204b, and gold layer 204c are cantilevered by extending beyond the PI layer 202a into unsupported window 202b area. Use of a flying lead to extend each pad 204 away from the PI layer 202a of the suspension 202 is largely because in the case in which a relatively large solder ball (e.g., diameter >40 μm) at a relatively high temperature is used to electrically interconnect the slider 205 to the suspension 202, the solder ball might come into contact with and thus burn or otherwise damage the PI layer 202a, but for the flying lead construction. With configuration 200, e.g., in view of the need for a flying lead to avoid PI layer 202a burn and with the free end (or "distal end") of each pad 204 positioned over and relatively unsupported by the window 202b area, there lies the risk of peeling, delamination, separation of the copper layer 204b and/or gold layer 204c from the base layer 204a (as depicted by the block arrows pointing in opposite directions), or otherwise deforming.

Suspension Pad Peel-Prevention Configuration

Figure 3A:
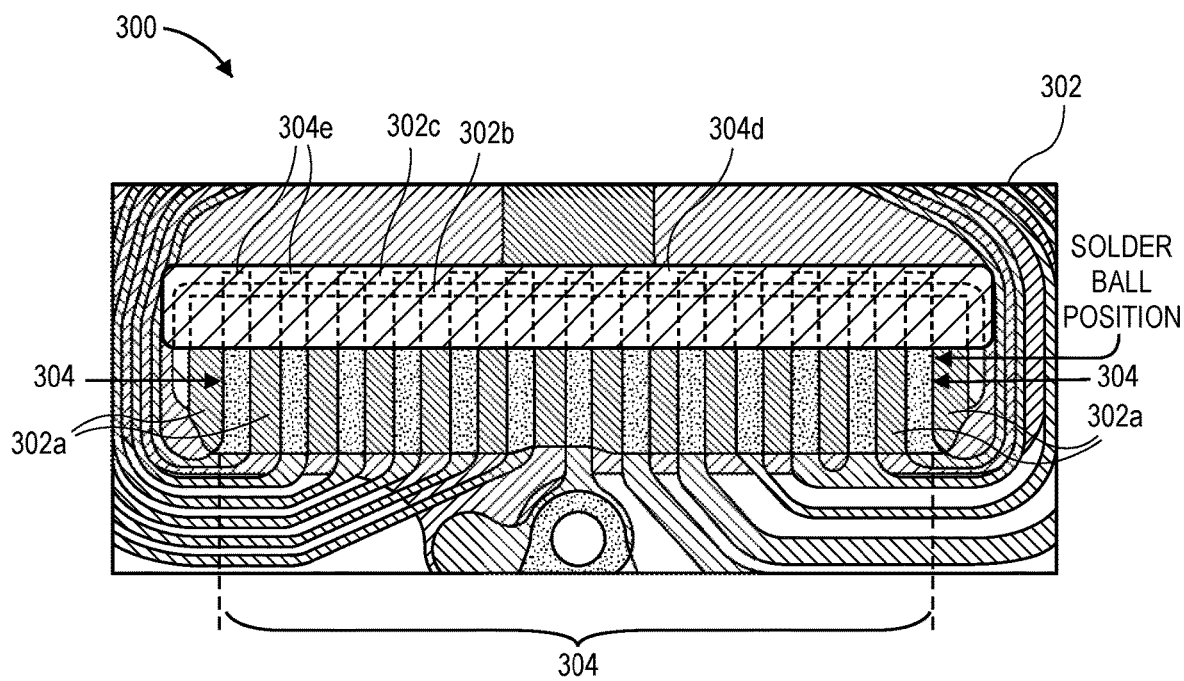
FIG. 3A is a top view illustrating a 13-pad extended configuration for a suspension, according to an embodiment.
Figure 3B:
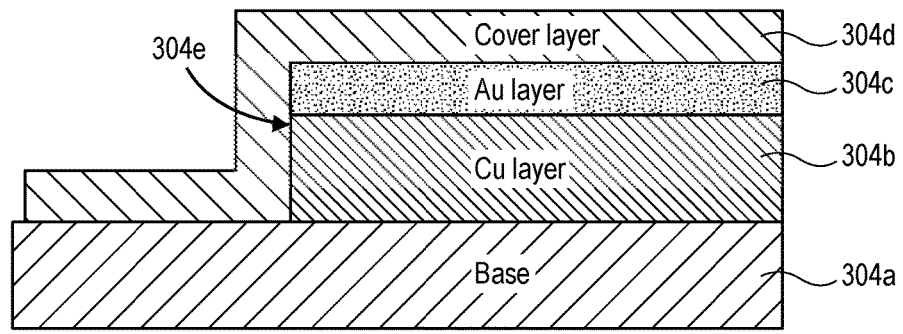
FIG. 3B is a cross-sectional side view illustrating the construction of an extended suspension electrical pad of FIG. 3A, according to an embodiment.

FIG. 3A is a top view illustrating a 13-pad extended configuration for a suspension, and FIG. 3B is a cross-sectional side view illustrating the construction of an extended suspension electrical pad of FIG. 3A, according to an embodiment. The suspension-pad configuration 300 of FIGS. 3A-3C comprises a suspension 302 (or "lead suspension"), on which a plurality of electrical connection pads 304 (or simply "electrical pads", "connection pads", or "pads") are coupled. The suspension 302 of configuration 300 comprises surface(s) such as PI layer 302a (only some of which are labeled, for clarity) typically composed of the polymer polyimide ("PI"). The pad 304 configuration comprises a pad base layer 304a or portion which supports a conductive copper layer 304b (or "Cu layer") on which lies a conductive gold layer 304c (or "Au layer"), according to an embodiment (FIG. 3B).

According to an embodiment, at least the base layer 304a of each pad 304 extends beyond the PI layer 302a (and some of the pads 304 may bridge over a relatively narrow window 302b, i.e., less distance than window 202b (FIGS. 2A, 2C)) to a pad-end fixing layer 302c or portion, to which the edge of the distal end 304e of each pad base layer 304a and thus each pad 304 is fixed. Similarly, each pad 304 including the base layer 304a and the copper layer 304b and gold layer 304c may extend beyond the PI layer 302a to the pad-end fixing layer 302c, to a position which is underneath the head slider upon assemblage, to which the edge of the distal end 304e of each pad 304 is fixed. As an implementation matter, note that in the depiction of FIG. 3A not all of the pads 304 bridge over the window 302b to the fixing layer 302c. However, the distal end 304e of each pad 304 is fixed in that each distal end 304e is fixedly supported by the base layer 304a and/or the fixing layer 302c, e.g., the base layer 304a extends to or is a continuous structure with the fixing layer 302c.

Here, in contrast with the configuration 200 of FIGS. 2A-2C, use of a flying lead is not necessary if a relatively small solder ball at a relatively low temperature is used to electrically interconnect the slider (see, e.g., slider 205 of FIG. 2A) to the suspension 302, whereby the solder ball is less likely to come into contact with and thus burn or otherwise damage the PI layer 302a. For example, in a scenario in which there are thirteen (13) or more pads, the solder ball size may be relatively small (e.g., diameter <35 μm, for pads in the 20-25 μm width range) and the soldering temperature utilized is lower (e.g., less laser power is needed to melt smaller solder ball) than with solder balls used in the context of configuration 200. While a no flying lead configuration is preferred here to provide structural support to inhibit peeling or other deformation at the distal end 304e of each pad 304, a flying lead arrangement may still be implemented in this scenario and fall within the scope of embodiments (see, e.g., FIG. 3D).

Furthermore and according to an embodiment, the distal end 304e of each pad 304 is covered with a cover layer 304d, such as a layer of polyimide. As depicted in the cross-section of FIG. 3B, the cover layer 304d covers the distal end 304e of the conductive layer(s) 304b, 304c and a portion of the pad-end fixing layer 302c. According to an embodiment and as illustrated in FIG. 3A, cover layer 304d is configured as a continuous layer covering the distal end 304e of the conductive layer(s) 304c, 304b of each of the plurality of electrical pads 304. According to an embodiment, the cover layer 304d is composed of a polyimide (PI) polymer.

Figure 3C:
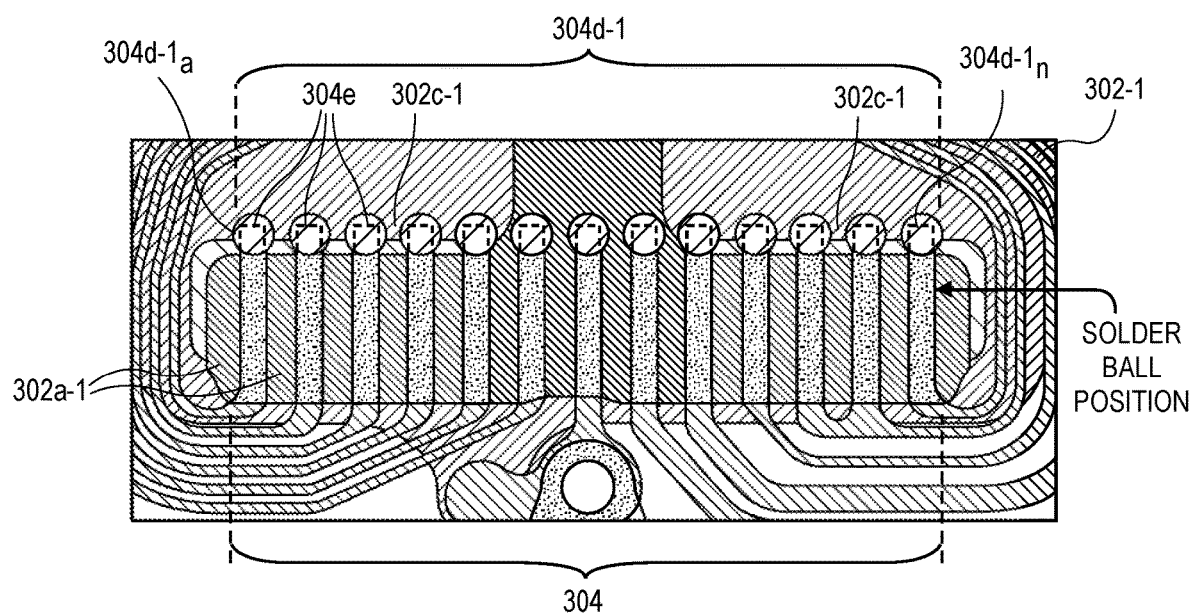
FIG. 3C is a top view illustrating a 13-pad extended configuration for a suspension, according to an embodiment.

FIG. 3C is a top view illustrating a 13-pad extended configuration for a suspension, according to an embodiment. Here, the cover layer 304d-1 of suspension 302-1 comprises a separate portion, 304d-1$_a$ through 304d-1$_n$, each covering the distal end 304e (only some of which are labeled here, for clarity) of a respective conductive layer(s) 304b, 304c (FIG. 3B) of the plurality of electrical pads 304. According to an embodiment, the cover layer 304d-1 is composed of a polyimide (PI) polymer.

Figure 3D:
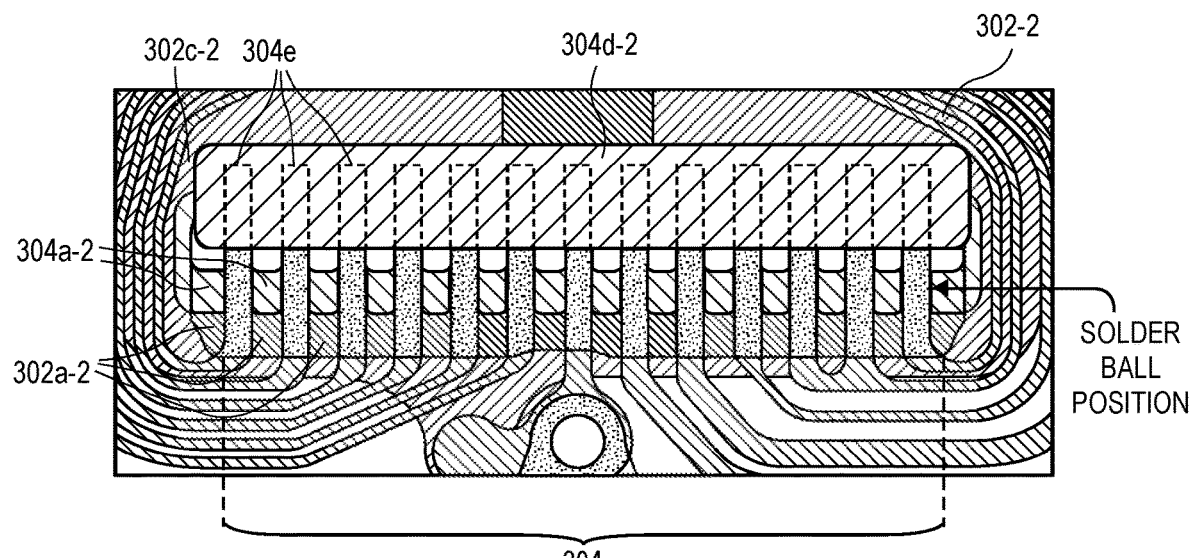
FIG. 3D is a top view illustrating a 13-pad extended configuration for a suspension, according to an embodiment.

FIG. 3D is a top view illustrating a 13-pad extended configuration for a suspension, according to an embodiment. Here, cover layer 304*d*-2 of suspension 302-2 is again configured as a continuous layer covering the distal end 304*e* (only some of which are labeled here, for clarity) of the conductive layer(s) 304*c*, 304*b* (FIG. 3B) of each of the plurality of electrical pads 304. Further, suspension 302-2 is constructed similarly to the "flying lead" construction of FIG. 2A in that the distal ends of the pads 304 including a base layer 304*a*-2 extend beyond a PI layer 302*a*-2, thereby protecting the PI layer 302*a*-2 from damage during soldering. According to an embodiment, the cover layer 304*d*-2 is composed of a polyimide (PI) polymer.

Thus, with each of the pad configurations of FIGS. 3A, 3C, 3D, the solder used to electrically couple each of a plurality of slider electrical pads with a corresponding suspension electrical pad 304 is positioned between the distal end and the proximal end of the conductive layer(s) 304*b*, 304*c* and over a portion of the pad base layer 304*a*, 304*a*-2, and the like, as generally depicted in FIGS. 3A, 3C-4B.

Figure 4A:
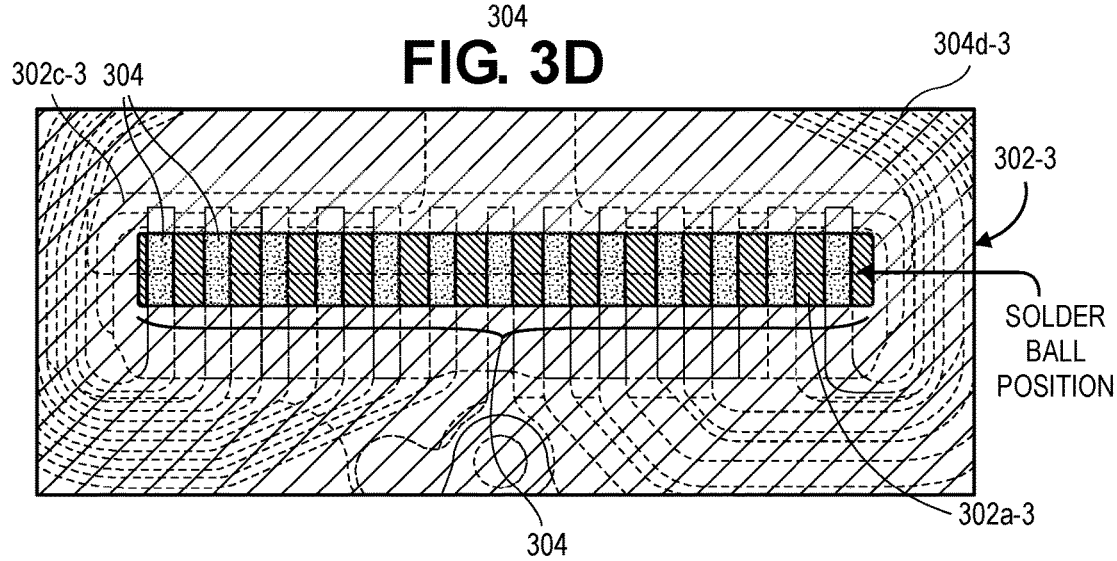
FIG. 4A is a top view illustrating a 13-pad extended configuration for a suspension, according to an embodiment.

FIG. 4A is a top view illustrating a 13-pad extended configuration for a suspension, according to an embodiment. Here, the cover layer 304*d*-3 of suspension 302-3 is configured to cover all of this area of the suspension 302-3 except for the area of the pads 304 at which the solder connection with a slider (see, e.g., slider 205 of FIG. 2A) would occur. According to an embodiment, the cover layer 304*d*-3 is composed of a polyimide (PI) polymer.

Figure 4B:
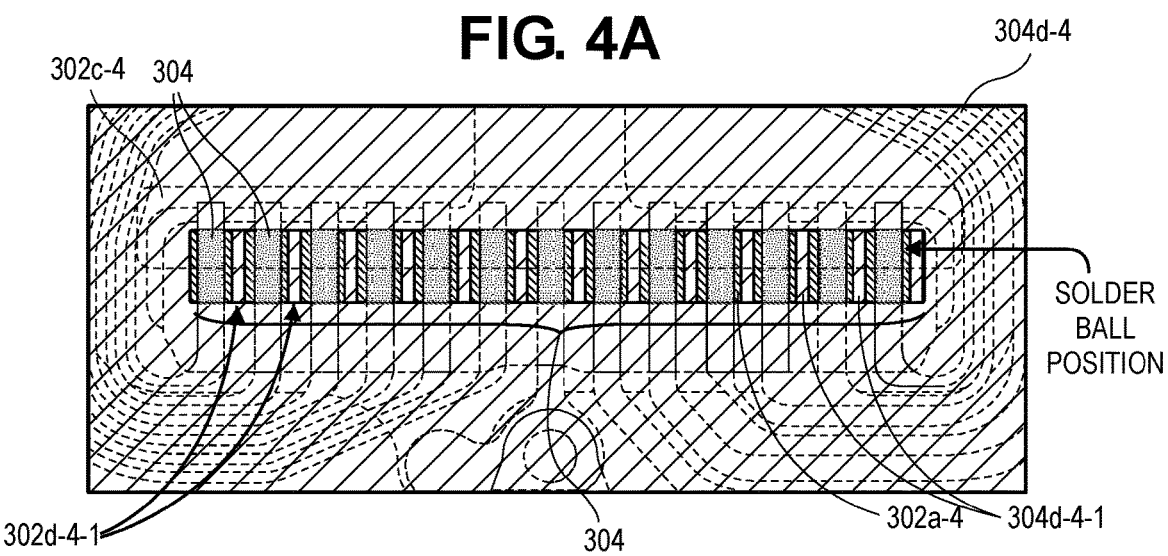
FIG. 4B is a top view illustrating a 13-pad extended configuration for a suspension, according to an embodiment.

FIG. 4B is a top view illustrating a 13-pad extended configuration for a suspension, according to an embodiment. Similarly to the embodiment of FIG. 4A, the cover layer 304*d*-4 of suspension 302-4 is configured to cover all of this area of the suspension 302-4 except for the area of the pads 304 at which the solder connection with a slider (see, e.g., slider 205 of FIG. 2A) would occur. Here further, the cover layer 304*d*-4 is configured to further cover a portion of the PI layer 302*a*-4 disposed between adjacent electrical pads of the plurality of electrical pads 304, such as with each cover layer portion 304*d*-4-1. According to an embodiment, the cover layer 304*d*-4 is composed of a polyimide (PI) polymer. However, with the embodiment of FIG. 4B, if a more heat-resistant material is implemented for the cover layer 304*d*-4, instead of PI material, then a reduction of solder bridges between adjacent electrical pads 304 can be expected.

Method for Manufacturing a Hard Disk Drive Suspension Assembly

Figure 5:
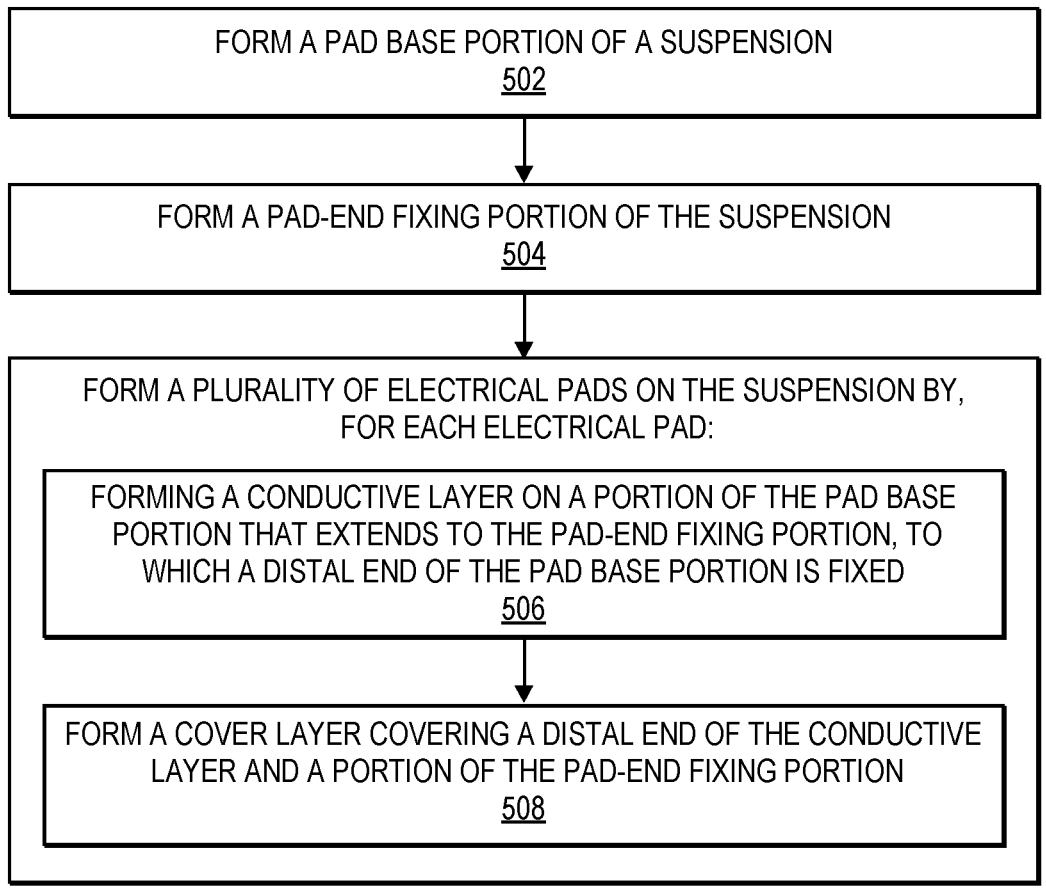
FIG. 5 is a flowchart illustrating a method for manufacturing a suspension, according to an embodiment.

FIG. 5 is a flowchart illustrating a method for manufacturing a suspension, according to an embodiment. For example, blocks 502-508 may be utilized to form a lead suspension for installation into a hard disk drive.

At block 502, form a pad base portion of the suspension. For example, pad base 302*a* (FIG. 3A, 3B), 302*a*-1 (FIG. 3C), 302*a*-2 (FIG. 3D), 302*a*-3 (FIG. 4A), 302*a*-4 (FIG. 4B), such as a polyimide base layer, is formed over a substrate according to known manufacturing process techniques.

At block 504, form a pad-end fixing portion of the suspension. For example, pad-end fixing portion 302*c* (FIG. 3A), 302*c*-1 (FIG. 3C), 302*c*-2 (FIG. 3D), 302*c*-3 (FIG. 4A), 302*c*-4 (FIG. 4B), such as a polyimide fixing layer, is formed over the substrate according to known manufacturing process techniques.

At block 506, form a plurality of electrical pads on the suspension by, for each electrical pad, forming a conductive layer on a portion of the pad base portion that extends to the pad-end fixing portion, to which a distal end of the pad base portion is fixed. For example, conductive layer(s) 304*b*, 304*c* (FIG. 3B) is formed on each corresponding pad base 302*a*, 302*a*-1, 302*a*-2, 302*a*-3, 302*a*-4, which extends to the pad-end fixing portion 302*c*, 302*c*-1, 302*c*-2, 302*c*-3, 302*c*-4 according to known manufacturing process techniques. According to an embodiment, forming each conductive layer includes forming the conductive layer(s) 304*b*, 304*c* to also extend to the pad-end fixing layer 302*c*, 302*c*-1, 302*c*-2, 302*c*-3, 302*c*-4 along with the corresponding pad base 302*a*, 302*a*-1, 302*a*-2, 302*a*-3, 302*a*-4.

At block 508, according to an embodiment, optionally form a cover layer covering a distal end of the conductive layer and a portion of the pad-end fixing portion. For example, cover layer 304*d* (FIG. 3A, 3B), 304*d*-1 (FIG. 3C), 304*d*-2 (FIG. 3D), 304*d*-3 (FIG. 4A), 304*d*-4 (FIG. 4B) is formed over the distal end 304*e* of the conductive layer(s) 304*b*, 304*c*, and over a portion of the pad-end fixing layer 302*c*, 302*c*-1, 302*c*-2, 302*c*-3, 302*c*-4, according to known manufacturing process techniques.

Use of an extended, fixed-end electrical pad as described herein inhibits the peeling, delamination, or otherwise deformation of an end edge of an electrical connection pad, such as the pads on a hard disk drive suspension component, which might otherwise cause head-gimbal assembly (HGA) manufacturing failures and consequent increased cost. Covering the end edge of each pad with a cover layer further inhibits such undesirable deformation of the pads. The techniques described herein are especially useful in relatively high-density, small pitch, narrow electrical pads, such as in a configuration of thirteen or more pads.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A suspension assembly for a hard disk drive (HDD), the suspension comprising:
   a suspension layer;
   a pad base layer over the suspension layer;
   a pad-end fixing layer separated from the suspension layer by an unsupported window;
   a plurality of electrical pads each comprising a substantially planar conductive layer fully supported on a corresponding extending portion of the pad base layer;
   wherein the window spans substantially normal to and underneath each of a plurality of the extending portions each of which extends beyond the suspension layer and bridging across the window to the pad-end fixing layer, to which a distal end of each extending portion of the pad base layer is fixed; and
   a cover layer covering a distal end of the conductive layer of each of the plurality of electrical pads and a portion of the pad-end fixing layer.

2. The suspension assembly of claim 1, wherein the conductive layer of each of the plurality of electrical pads extends to the pad-end fixing layer.

3. The suspension assembly of claim 1, wherein the cover layer is configured as a continuous layer covering the distal end of the conductive layer of each of the plurality of electrical pads.

4. The suspension assembly of claim 1, wherein the cover layer comprises a separate portion each covering the distal end of a respective conductive layer of the plurality of electrical pads.

5. The suspension assembly of claim 1, wherein the cover layer is configured to further cover a portion of the pad base layer disposed between adjacent electrical pads of the plurality of electrical pads.

6. The suspension assembly of claim 5, wherein the cover layer is composed of a heat-resistant material.

7. The suspension assembly of claim 1, wherein the cover layer is composed of a polyimide polymer.

8. The suspension assembly of claim 1, wherein the pad base layer and the pad-end fixing layer are the same layer of material.

9. The suspension assembly of claim 1, further comprising:
   a head slider electrically coupled, with solder, with the plurality of electrical pads of the suspension assembly;
   wherein the solder is at a position between the distal end and a proximal end of the conductive layer of each of the plurality of electrical pads and over the pad base layer.

10. A hard disk drive comprising the suspension assembly of claim 1.

11. A method for manufacturing a suspension for a hard disk drive, the method comprising:
    forming a suspension layer;
    forming a pad base portion of the suspension over the suspension layer;
    forming a pad-end fixing portion of the suspension separated from the suspension layer by an unsupported window; and
    forming a plurality of electrical pads on the suspension by, for each electrical pad:
       forming a substantially planar conductive layer fully supported on a corresponding extended portion, of the pad base portion, that extends beyond the suspension layer and bridges across the window spanning substantially normal to and underneath each of a plurality of the extended portions to the pad-end fixing portion, to which a distal end of the extended portion is fixed.

12. The method of claim 11, wherein forming the conductive layers includes forming the conductive layers to extend to the pad-end fixing portion.

13. The method of claim 11, further comprising:
    forming a cover layer covering a distal end of the conductive layer of each of the plurality of electrical pads and a portion of the pad-end fixing portion.

14. The method of claim 13, wherein forming the cover layer includes forming a continuous cover layer covering the distal end of the conductive layer of each of the plurality of electrical pads.

15. The method of claim 13, wherein forming the cover layer includes forming a separate portion each covering the distal end of a respective conductive layer of the plurality of electrical pads.

16. The method of claim 13, wherein forming the cover layer includes forming the cover layer to further cover a portion of the pad base portion positioned between adjacent electrical pads of the plurality of electrical pads.

17. A hard disk drive (HDD) comprising:
    a plurality of recording media rotatably mounted on a spindle;
    a plurality of head sliders each electrically coupled with a corresponding suspension assembly and each housing a respective read-write transducer configured to read from and to write to at least one recording media of the plurality of recording media;
    means for moving the plurality of head sliders to access portions of the at least one recording media; and
    means for transmitting electrical signals to and from a respective head slider of the plurality of head sliders;
    wherein each suspension assembly comprises:
       a suspension layer;
       a pad base layer over the suspension layer;
       a pad-end fixing layer separated from the suspension layer by an unsupported window; and
       a plurality of electrical pads each comprising a substantially planar conductive layer fully supported on a corresponding extending portion of the pad base layer;
       wherein the window spans substantially normal to and underneath each of a plurality of the extending portions each of which extends beyond the suspension layer and bridges across the window to the pad-end fixing layer, to which a distal end of each extending portion of the pad base layer is fixed.

18. The HDD of claim 17, each suspension assembly further comprising:
    a cover layer covering a distal end of the conductive layer of each of the plurality of electrical pads and a portion of the pad-end fixing layer.

19. The HDD of claim 18, wherein the conductive layer of each of the plurality of electrical pads extends to the pad-end fixing layer.

20. The HDD of claim 19, wherein:
- each head slider is electrically coupled with solder to a corresponding one of the plurality of electrical pads of the corresponding suspension assembly; and
- the solder is positioned between a distal end and a proximal end of the conductive layer of each of the plurality of electrical pads and over the pad base layer.

\* \* \* \* \*